US012734386B2

(12) United States Patent
Chiba et al.

(10) Patent No.: US 12,734,386 B2
(45) Date of Patent: Sep. 15, 2026

(54) SPRINKLER HEAD

(71) Applicant: SENJU SPRINKLER CO., LTD., Tokyo (JP)

(72) Inventors: Masaharu Chiba, Tokyo (JP); Yoshiki Sasaki, Tokyo (JP); Kazuma Ito, Tokyo (JP)

(73) Assignee: SENJU SPRINKLER CO., LTD., Tokyo (JP)

(*) Notice: Subject to any disclaimer, the term of this patent is extended or adjusted under 35 U.S.C. 154(b) by 201 days.

(21) Appl. No.: 18/554,882

(22) PCT Filed: Mar. 30, 2022

(86) PCT No.: PCT/JP2022/016142
§ 371 (c)(1),
(2) Date: Oct. 11, 2023

(87) PCT Pub. No.: WO2022/220132
PCT Pub. Date: Oct. 20, 2022

(65) Prior Publication Data
US 2024/0198154 A1 Jun. 20, 2024

(30) Foreign Application Priority Data
Apr. 15, 2021 (JP) ................................ 2021-068870

(51) Int. Cl.
*A62C 37/11* (2006.01)
*A62C 31/02* (2006.01)

(52) U.S. Cl.
CPC .............. *A62C 37/11* (2013.01); *A62C 31/02* (2013.01)

(58) Field of Classification Search
CPC ................................ A62C 31/02; A62C 37/11
(Continued)

(56) References Cited

U.S. PATENT DOCUMENTS 4,618,002 A * 10/1986 Mears .................... A62C 37/09 169/37
5,036,923 A * 8/1991 Shea, Sr. ................ A62C 37/12 169/41
(Continued)

FOREIGN PATENT DOCUMENTS

CN 105263587 A 1/2016
EP 0505672 A2 9/1992
(Continued)

OTHER PUBLICATIONS

International Search Report for PCT Patent App. No. PCT/JP2022/016142 (Jun. 14, 2022).
(Continued)

*Primary Examiner* — Jason J Boeckmann
(74) *Attorney, Agent, or Firm* — Future IP LLC; Tomoko Nakajima

(57) ABSTRACT

To provide a sprinkler head in which the amount of water sprinkled in a direction in which a pin supporting a deflector is provided is increased. Included are: a body having a nozzle through which a fire-extinguishing liquid is discharged; a disk-like deflector that sprinkles the fire-extinguishing liquid discharged from the nozzle outward in a direction intersecting the axis of the nozzle; and a support that supports the deflector. A nozzle-side surface of the deflector has a recess extending from a portion around the support toward an outer edge of the deflector and recessed into the nozzle-side surface of the deflector. First slits are provided on both sides of the recess in the width direction such that open ends are adjacent to the outer edge of the recess.

20 Claims, 10 Drawing Sheets

(58) Field of Classification Search
USPC .......... 169/37
See application file for complete search history.

(56) References Cited

U.S. PATENT DOCUMENTS

| | | | | |
|---|---|---|---|---|
| 7,343,980 | B2 | 3/2008 | Pahila | |
| 10,238,903 | B2 | 3/2019 | Pipe | |
| 11,511,144 | B2 * | 11/2022 | Koiwa | A62C 37/12 |
| 2012/0285707 | A1 | 11/2012 | Kameishi et al. | |
| 2015/0246253 | A1 | 9/2015 | Miller et al. | |
| 2017/0296852 | A1 * | 10/2017 | Pipe | A62C 37/09 |
| 2018/0304111 | A1 * | 10/2018 | Karihara | B05B 1/267 |
| 2020/0338577 | A1 | 10/2020 | Kuffel et al. | |
| 2021/0094051 | A1 | 4/2021 | Koiwa | |
| 2021/0197002 | A1 * | 7/2021 | Kikuchi | A62C 37/12 |
| 2021/0260423 | A1 | 8/2021 | Koiwa | |
| 2024/0198154 | A1 | 6/2024 | Chiba et al. | |

FOREIGN PATENT DOCUMENTS

| | | | |
|---|---|---|---|
| JP | H6-039030 | U | 5/1994 |
| JP | 3014504 | U | 8/1995 |
| JP | 3016190 | U | 9/1995 |
| JP | 2574641 | Y2 | 6/1998 |
| JP | 2001-46544 | A | 2/2001 |
| JP | 2001095944 | A | 4/2001 |
| JP | 2003-062108 | A | 3/2003 |
| JP | 2004-024555 | A | 1/2004 |
| JP | 2005-027929 | A | 2/2005 |
| JP | 2012-040165 | A | 3/2012 |
| JP | 2012-080961 | A | 4/2012 |
| JP | 2019-187774 | A | 10/2019 |
| KR | 20190098604 | A | 8/2019 |
| TW | 201932160 | A | 8/2019 |
| WO | WO2013/042214 | A1 | 3/2013 |
| WO | WO2020-008707 | A1 | 1/2020 |
| WO | WO2022/220132 | A1 | 10/2022 |

OTHER PUBLICATIONS

Taiwanese Office Action for the patent application No. 111114002 (dated Jun. 25, 2025) with English language translation thereof.

Japanese Office Action for the patent application No. JP2024-513576 (dated Aug. 26, 2025) with English language translation thereof.

Japanese Notice of Allowance for the patent application No. JP2023-514594 (dated Nov. 11, 2025) with English language translation thereof.

Taiwanese Office Action for Taiwanese Patent Application No. 112110879 (dated Feb. 13, 2026) with English language translation thereof.

Office Action of U.S. Appl. No. 18/848,607 (dated Jun. 16, 2026).

* cited by examiner

SPRINKLER HEAD

This application is a national phase entry under 35 U.S.C. § 371 of PCT Patent Application No. PCT/JP2022/016142, filed on Mar. 30, 2022, which claims priority under 35 U.S.C. § 119 to Japanese Patent Application No. 2021-068870, filed Apr. 15, 2021, both of which are incorporated by reference.

TECHNICAL FIELD

The present disclosure relates to fire suppression sprinkler heads.

BACKGROUND ART

A sprinkler head is automatically actuated to sprinkle water in the event of fire. A nozzle is normally closed by a valve. The valve is supported at the lower end of a body by a heat-sensitive actuator. The heat-sensitive actuator is decomposed and actuated when a heat-sensitive element incorporated in the heat-sensitive actuator is operated by the heat of fire. Although the valve is pressed toward the nozzle by the heat-sensitive actuator, the valve is separated from the nozzle to open the nozzle. The water discharged from the nozzle collides with a plate-like deflector provided in the extension direction of the axis of the nozzle and is sprinkled in all directions to extinguish the fire.

Examples of such sprinkler heads include flush-type sprinkler heads. In a flush-type sprinkler head, the body connected to a water supply pipe is embedded in a ceiling, and only the lower part of the heat-sensitive actuator projects indoors from the ceiling surface. The deflector is accommodated in the sprinkler head. In the event of fire, the deflector moves by a predetermined distance into a room after the heat-sensitive actuator is decomposed and actuated. The deflector is connected to the body with a plurality of pins.

The water discharged from the nozzle collides with the center of the deflector, flows radially, and is sprinkled from the edge of the deflector. At this time, around the pins, the water flowing from the center of the deflector toward the edge is blocked by the pins. Thus, the amount of water sprinkled in the directions in which the pins are disposed tends to be small.

Therefore, smaller number of pins realizes a more uniform water sprinkle pattern. However, reducing the number of pins requires increasing the thickness of the pins to ensure strength capable of withstanding the momentum of water flow. Increasing the thickness of the pins increases the influence on the water flow, making it difficult to obtain a uniform water sprinkle pattern.

PTL 1 describes means for solving this problem, in which the deflector is provided with recesses at positions around pins, and bottoms of the recesses extend to the outer circumference of the deflector. In the sprinkler head in PTL 1, the water flow is guided into the recesses, so that a certain amount of water flows in the directions in which the pins are provided.

CITATION LIST

Patent Literature

PTL 1: Japanese Unexamined Utility Model Registration Application Publication No. 6-39030

SUMMARY OF INVENTION

Technical Problem

An object of the present disclosure is to provide a sprinkler head in which the amount of water sprinkled in directions in which pins supporting a deflector are provided in the sprinkler head can be increased.

Solution to Problem

In order to achieve the above-described object, the present disclosure provides a sprinkler head described below. Specifically, an aspect of the present disclosure is a sprinkler head including: a body having a nozzle that discharges a fire-extinguishing liquid; a valve cap that closes the nozzle; a heat-sensitive actuator that holds the valve cap in a state of closing the nozzle and that releases the closed state when decomposed and actuated; a disk-like deflector that sprinkles the fire-extinguishing liquid discharged from the nozzle outward in a direction intersecting an axis of the nozzle; and a support that supports the deflector. A nozzle-side surface of the deflector has a recess extending from a portion around the support toward an outer edge of the deflector and recessed into the nozzle-side surface of the deflector. First slits are provided on both sides of the recess in the width direction such that open ends thereof are adjacent to an outer edge of the recess.

According to the aspect of the present disclosure, the water flowing into the recess is straightened, so that a large amount of water is sprinkled in a direction orthogonal to the outer edge of the recess, and the water is sprinkled from the first slits toward the extension of a virtual line. Thus, it is possible to increase the amount of water sprinkled in the direction in which the pin is disposed.

Advantageous Effects of Invention

According to the present disclosure, it is possible to increase the amount of water sprinkled in the direction in which the pin supporting the deflector is disposed in the sprinkler head.

DESCRIPTION OF EMBODIMENTS

Figure 1:
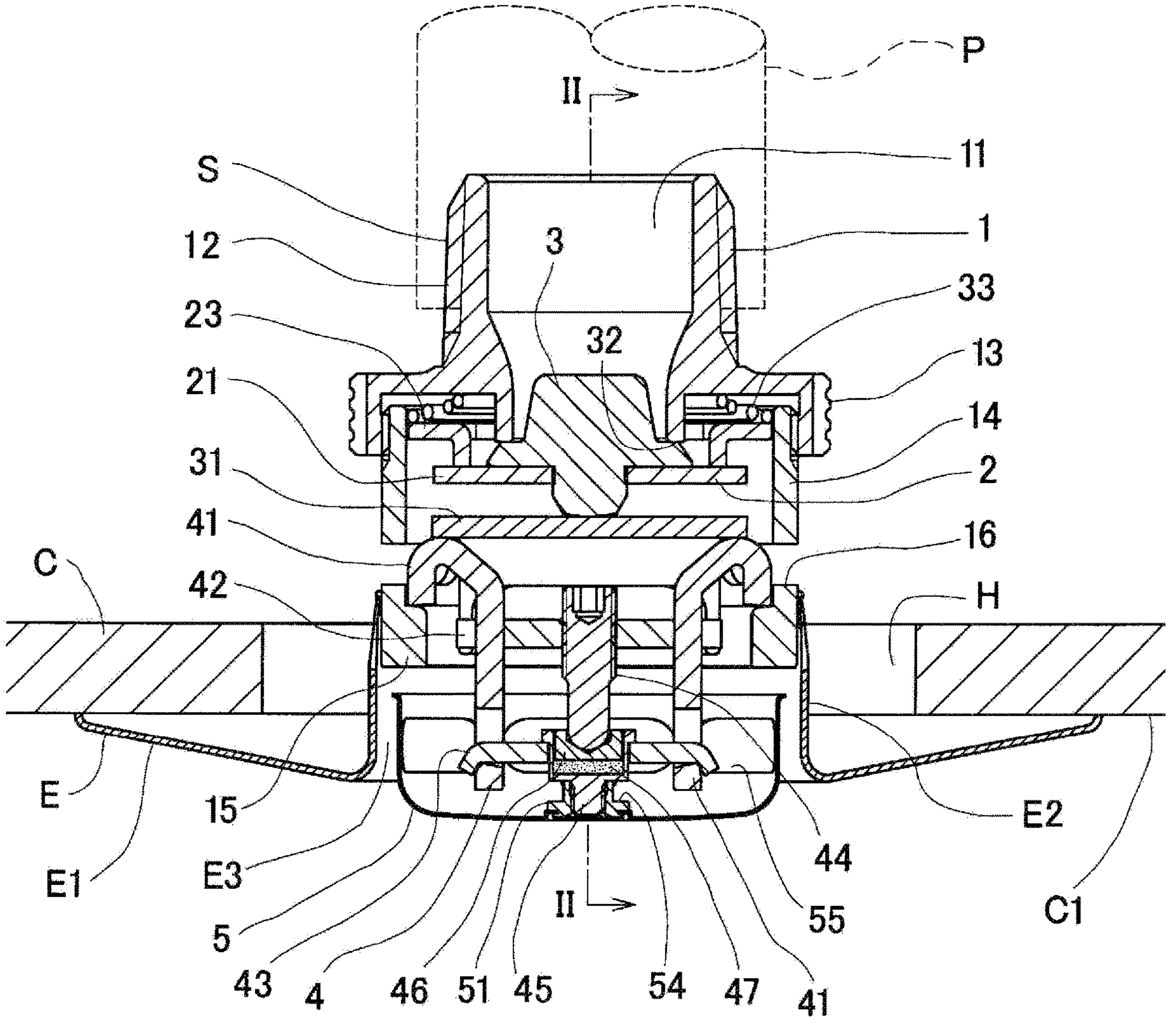
FIG. 1 is a cross-sectional view of a sprinkler head of the present disclosure.

Hereinbelow, an aspect of the present disclosure will be described in detail. The description is not intended to limit the scope of the disclosure, but should be understood as the description of illustrative embodiments. The following description should not unduly limit the claims, and not all of the configurations described in the embodiments are necessarily essential as solving means.

In the following description, terms indicating directions, such as "top", "bottom", "left", and "right" are used for convenience of description, and are not intended to limit the method of use or the mode of use. The terms such as "the first" and "the n-th" (n is an integer) following "the first" in the description and claims are used as distinguishing terms for distinguishing between different elements, and do not denote any particular order, superiority, or inferiority.

The terminology used in the following description is for the purpose of describing particular embodiments only and is not intended to limit the scope of the present disclosure. The components of the aspect described and claimed herein are intended to include plural forms as well, unless the context clearly indicates otherwise.

The term "and/or" is intended to refer to and include any and all possible combinations of one or more of the associated listed elements. The terms "includes", "including", "comprises", and/or "comprising" as used in the specification and claims specify the presence of features, operations, elements, or steps. However, these terms are used as the terms that do not preclude the presence or addition of one or more other features, operations, elements, steps, and/or groups thereof.

An embodiment of a "sprinkler head" of the present disclosure will be described with reference to FIGS. 1 to 7. A sprinkler head S has a body 1, a deflector unit 2, a valve cap 3, a heat-sensitive actuator 4, and a heat collector 5. The sprinkler head S according to this embodiment is a flush-type sprinkler head, in which the body 1 connected to a water supply pipe is embedded in a ceiling.

The body 1 has a hollow tubular shape, and the inside thereof serves as a nozzle 11. The nozzle 11 is tubular and extends in a tube-axis direction (height direction, vertical direction) between one end and the other end of the body 1. In the present specification and claims, the "axial direction" of the nozzle 11 is also referred to as a "tube-axis direction". The body 1 is provided with, at one end thereof, a male screw 12 to be connected to a water supply pipe P. The body 1 has, at the other end thereof, a flange 13 extending outward. A tubular frame 14 is screw-connected to the flange 13.

The frame 14 is provided on the outer circumferential side of an outlet end of the nozzle 11. A step 15 extending radially inward is provided at the lower end (the end of the frame 14 on the side opposite to the side connected to the flange 13) inside the frame 14.

Levers 41 of the heat-sensitive actuator 4 (described below) are engaged with the step 15.

Figure 3:
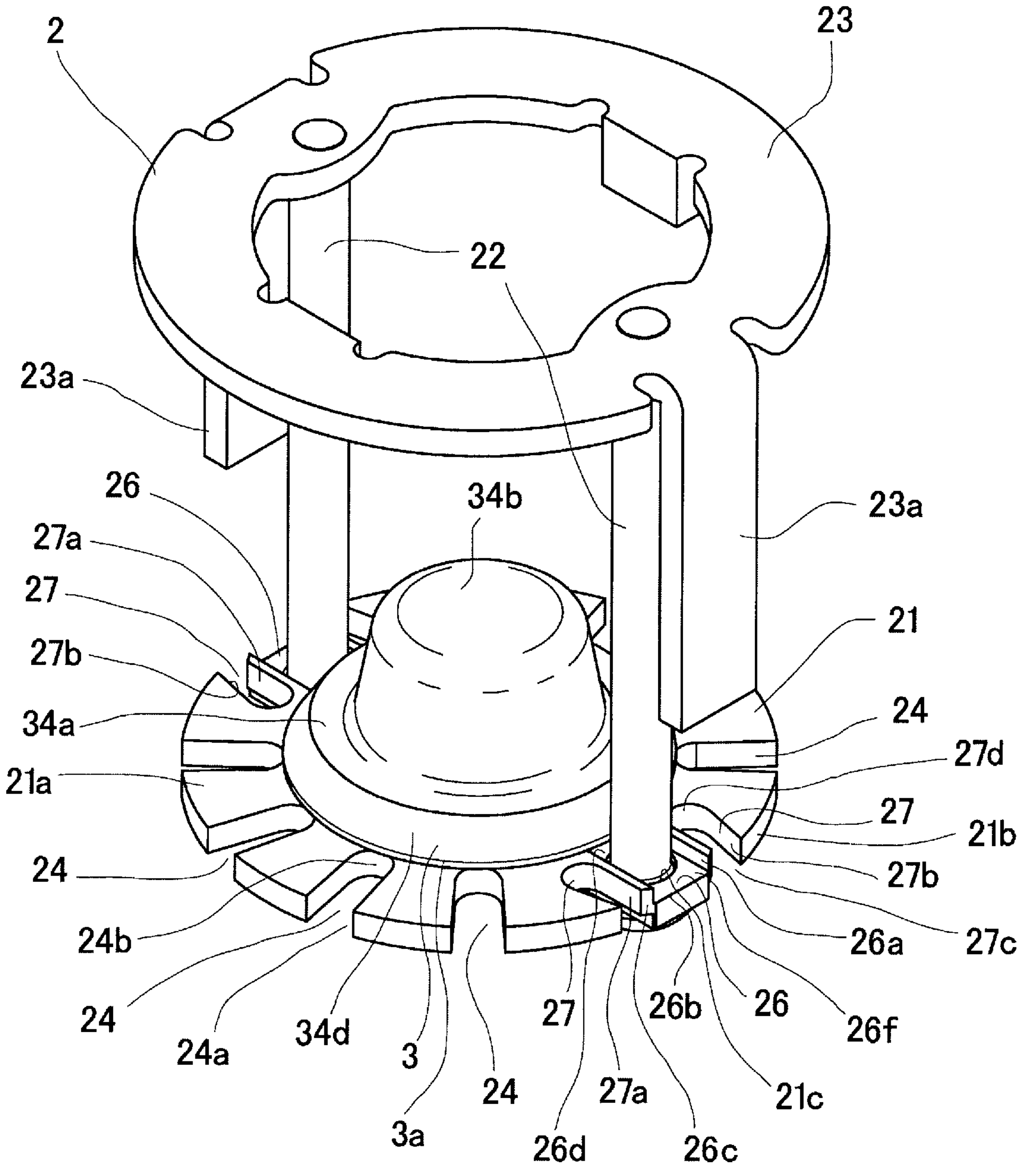
FIG. 3 is a perspective view of a deflector unit.

The deflector unit 2 illustrated in FIG. 3 includes a deflector 21, pins 22 serving as supports, and a guide ring 23. The deflector unit 2 is accommodated in the frame 14. The deflector 21 is disc-shaped and has a plurality of slits 24 in the circumferential edge (outer edge) thereof. The slits 24 are provided symmetrically with respect to a virtual line Lx passing through the central axes of the pins 22 and the center of the deflector 21. Each slit 24 has such a shape that the width thereof increases, i.e., tapered, from the side adjacent to the center of the deflector 21 toward an open end 24*a* on the outer circumferential side (outer edge side). The angle of the taper is preferably 2 to 10°. In this embodiment, the angle of the taper is set to 5°.

The deflector 21 has a hole (center hole) penetrating in the plate thickness direction (the tube-axis direction of the body 1) at the center thereof, and the valve cap 3 is rotatably provided in the hole. Closed ends 24*b* of the slits 24, which are the ends adjacent to the center of the deflector 21, are configured to overlap the outer edge of the valve cap 3.

Multiple pins 22 are provided between the deflector 21 and the guide ring 23. The sprinkler head S according to this embodiment has two pins 22. The pins 22 are inserted through holes 21C (pin insertion holes) formed in the vicinity of the circumferential edge of the deflector 21 so as to penetrate through the deflector 21 in the thickness direction thereof (the tube-axis direction of the body 1). The pins 22 are disposed adjacent to an outer edge 3*a* of the valve cap 3 disposed on the deflector 21. Ends on one side (i.e., the ends near the guide ring) of the pins 22 are fixedly connected to the annular guide ring 23, and the other ends (the ends near the deflector) of the pins 22 have flanges 25. With this configuration, the deflector 21 is held so as to be slidable between the guide ring 23 and the flanges 25.

A nozzle-11-side planar surface 21*a* of the deflector 21 has recesses 26 extending from portions around the holes 21C, through which the pins 22 are inserted, toward the outer edge 21*b* of the deflector 21 and recessed into the nozzle-11-side planar surface 21*a* of the deflector 21 toward the heat-sensitive actuator 4. Steps between bottom surfaces 26*f* of the recesses 26 and the planar surface 21*a*, which is a general surface of the deflector 21, are side walls 26*a*. The water (fire-extinguishing liquid) flowing into the recesses 26 is straightened by the side walls 26*a* and sprinkled from outer edges 26*b* of the recesses 26. The steps of the recesses 26 have a function of guiding the fire-extinguishing liquid discharged from the nozzle 11 to the recesses 26. In this embodiment, although an example has been illustrated in which the bottom surfaces 26*f* of the recesses 26 are recessed into the planar surface 21*a* of the deflector 21 so as to protrude downward, for example, the recesses may be formed by squeezing a metal material forming the deflector 21. In that case, the thickness of the recesses (the bottom surface portions of the recesses) in the thickness direction of the deflector 21 is smaller than the thickness of portions around the recesses.

Figure 5:
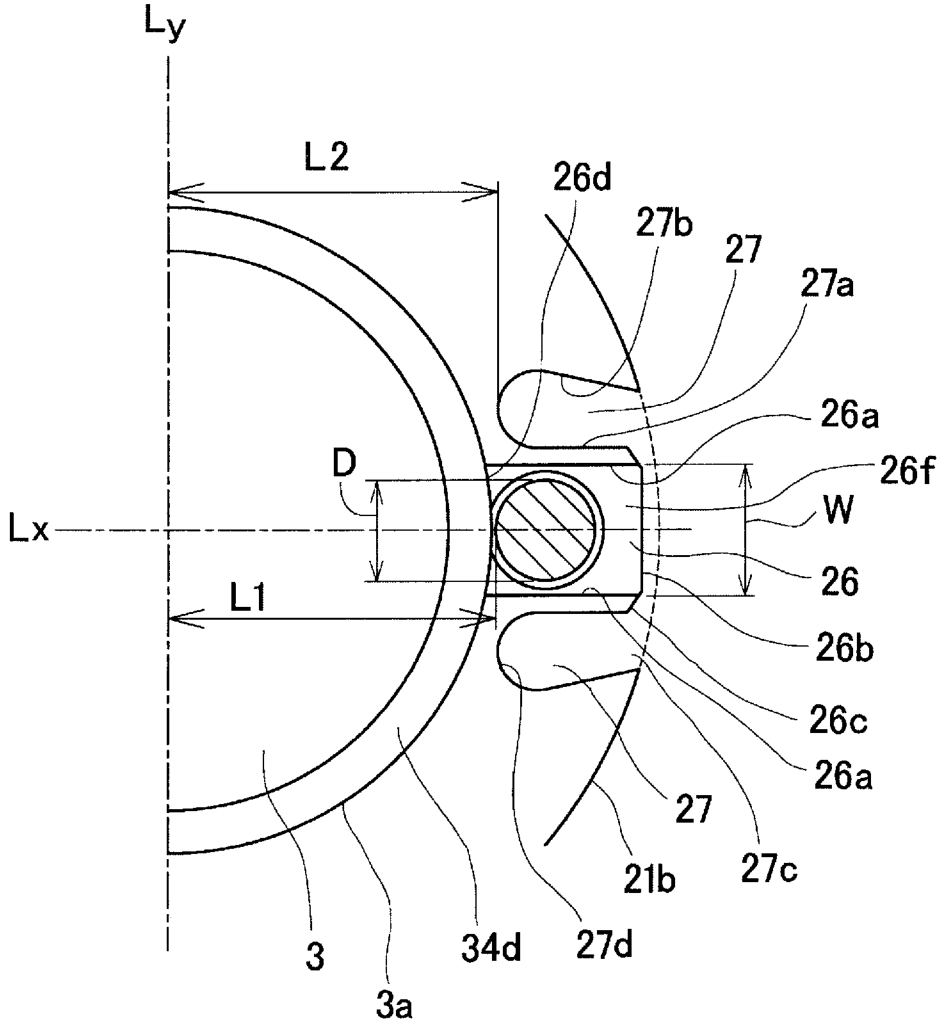
FIG. 5 is an enlarged view of the vicinity of a pin (support) in FIG. 3.

The outer edges 26*b* of the recesses 26 are formed linearly and positioned on the inner side of the virtual outer circumferential circle of the deflector 21 indicated by a dashed line in FIG. 5. This allows a large amount of water to be sprinkled in the directions orthogonal to the linear outer edges 26*b*. In addition, because the linear outer edges 26*b* of the recesses 26 are positioned on the inner side of the virtual outer circumferential circle of the deflector 21, the water sprinkled from the recesses 26 flies a shorter distance than the water sprinkled from the outer edge of the deflector 21. Thus, it is possible to sprinkle water over an area close to the place where the sprinkler head S is installed. Inner edges 26*d* of the recesses 26 are positioned to overlap the outer edge 3*a* of the valve cap 3. Although the outer edges 26*b* of the recesses 26 are formed linearly in this embodiment, the shape of the outer edges 26*b* is not limited to a linear shape as long as the outer edges 26*b* are positioned on the inner side of the virtual outer circumferential circle of the deflector 21.

As illustrated in FIG. 5, it is desirable to configure such that the width W of the recess 26 is 1.2 to 1.5 times the diameter D of the pin 22. In this embodiment, the width is about 1.3 times the diameter D. With this configuration, the spaces between the pin 22 and the side walls 26*a* of the recess 26 serve as narrow portions 26*e*. Thus, the flow rate of the water passing through the narrow portions 26*e* increases.

First slits 27 are provided on both sides of the recess 26 in the width direction. As illustrated in FIG. 5, the first slits 27 are provided such that open ends 27*c* thereof are adjacent to the outer edge 26*b* of the recess 26. The first slits 27 each have a first side 27*a* located adjacent to the pin 22 and a second side 27*b* facing the first side 27*a*. The first side 27*a* is formed along the side wall 26*a* of the adjacent recess 26 and is formed parallel to the virtual line Lx. The second side 27*b* is formed so as to approach the first side 27*a* from the closed end toward the open end of the first slit 27. In other words, the second side 27*b* is inclined with respect to the virtual line Lx, and is formed so as to intersect the virtual line Lx when the second side 27*b* is extended in the direction of the open end 27*c* of the first slit 27.

Specifically, in each first slit 27, the second side 27*b* is inclined with respect to the virtual line Lx so as to intersect with the virtual line Lx when the second side 27*b* is extended in the direction of the open end 27*c* of the first slit 27. Because the width of the first slits 27 decreases toward the outer edge of the deflector 21, it is possible to sprinkle water from the first slits 27 toward the extension of the virtual line LX, in the directions in which the pins 22 are disposed, while increasing the flow rate of the water flowing therein. In this embodiment, because the first slits 27 are provided on both sides of the recesses 26 in the width direction, the amount of water sprinkled in the directions in which the pins 22 are disposed can be increased.

The water flowing into the first slits 27 flows along the second sides 27*b* and then flows in the direction perpendicular to the straight line connecting the open ends 27*c*. As a result, the water flows toward the extension of the virtual line Lx behind the pin 22. Furthermore, by cutting corners between the outer edges 26*b* of the recesses 26 and the first slits 27 at an angle to provide inclined surfaces 26*c*, the water flowing through the first slits 27 is guided in the direction of the virtual line Lx by the inclined surfaces 26*c*.

As illustrated in FIG. 5, closed ends 27*d* of the first slits 27 are positioned away from the outer edge 3*a* of the valve cap 3. More specifically, a distance L1 between an orthogonal virtual line Ly, which is obtained by rotating the virtual line Lx by 90° about the center of the deflector 21, and the outer circumference of the pin 22 is set to be substantially equal to a distance L2 between the orthogonal virtual line Ly and the closed ends of the first slits 27. When the first slits 27 are shallow, i.e., the distance L1<the distance L2, water is sprinkled over a position far from the head in the direction behind the pin 22. In contrast, when the first slits 27 are deep, i.e., the distance L1≥the distance L2, water is sprinkled over a position too close to the head in the direction behind the pin 22. Thus, in this embodiment, the distance L1 and the distance L2 are set to be substantially equal, so that water can be easily sprinkled over a desired suitable position that is appropriately close to the head in the direction behind the pin 22.

As described above, the ends on one side of the pins 22 are fixedly connected to the guide ring 23. The outer diameter of the guide ring 23 is smaller than the inner diameter of the frame 14 and larger than the inner diameter of the step 15. Thus, the guide ring 23 is configured to be engaged with the step 15 after being detached by the actuation of the heat-sensitive actuator 4.

Arms 23*a* are provided on the outer edge of the guide ring 23. The arms 23*a* are provided parallel to the pins 22 and are disposed adjacent to the pins 22. More specifically, the arms 23*a* are disposed on a virtual plane (not illustrated) where the virtual line Lx and the axis of the nozzle 11 intersect with each other. The length of the arms 23*a* is shorter than the length of the pins 22. The arms 23*a* are accommodated in grooves 15*a* provided in the step 15 of the frame 14. The grooves 15*a* are parallel to the axis of the nozzle 11 and act as guides when the guide ring 23 slides in the frame 14.

Figure 2:
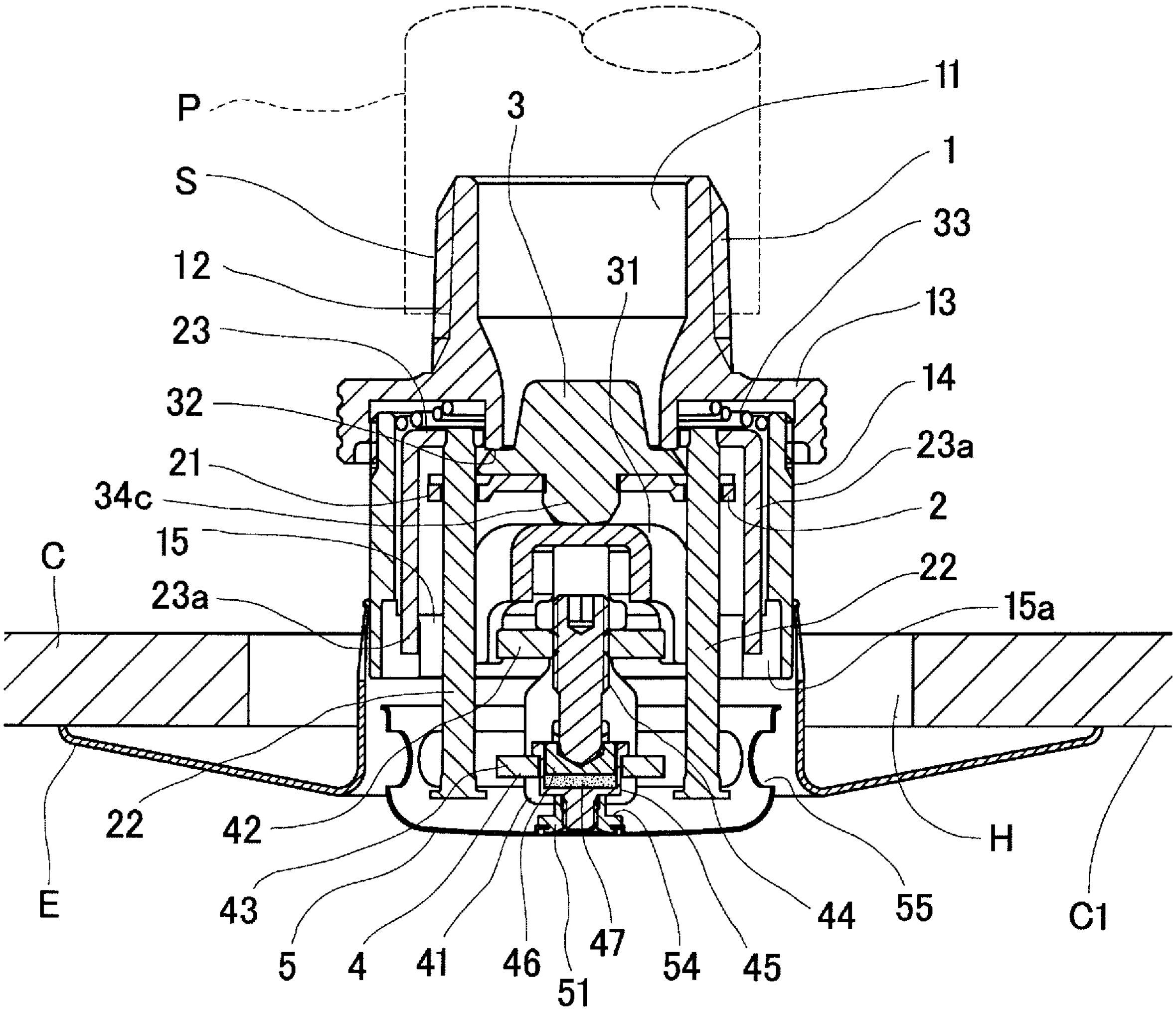
FIG. 2 is a cross-sectional view taken along line II-II in FIG. 1.

While the nozzle 11 is opened to discharge water, the side surfaces of the arms 23*a* are held by the grooves 15*a*. This allows the planar surface 21*a* of the deflector 21 to be perpendicular to the central axis of the nozzle 11 even when the water flow is unstable, preventing movements of the deflector 21. Furthermore, because the arms 23*a* are accommodated in the grooves 15*a*, the guide ring 23 and the deflector 21 are prevented from moving in the circumferential direction. As illustrated in FIG. 2, the grooves 15*a* are provided at positions rotated by 90° about the axis of the nozzle 11, from the positions where the levers 41 are engaged with the step 15.

The valve cap 3 is formed in a disk shape having a protrusion on the side adjacent to the nozzle 11. A plate-like saddle 31 is provided between the valve cap 3 and the levers 41. The levers 41 engaged with the step 15 press the valve cap 3 through the saddle 31, so that the valve cap 3 is held at the outlet position of the nozzle 11 and closes the outlet end of the nozzle 11.

A seal member 32 is provided between the valve cap 3 and the outlet end of the nozzle 11. The seal member 32 is made of, for example, fluororesin. Although the seal member 32 is provided at the outlet end of the nozzle 11 in this embodiment, the seal member 32 may be provided at the valve cap 3. In this state, the deflector 21 with the valve cap 3 thereon is disposed in the frame 14, at a position near the guide ring 23. A biased spring 33 is disposed between the guide ring 23 and the flange 13. When the heat-sensitive actuator 4 is actuated, the spring 33 facilitates the movement of the guide ring 23, the deflector 21, and the valve cap 3 to the outside of the frame 14. The load of the spring 33 is lower than the load of pressing the valve cap 3 against the outlet end of the nozzle 11.

As illustrated in FIGS. 2 and 3, the valve cap 3 includes an annular planar portion 34*a* to be in contact with the outlet end of the nozzle 11, an inner protrusion 34*b* provided on the inner side of the planar portion 34*a* and protruding toward the inside of the nozzle 11, and an outer protrusion 34*c* protruding in the direction opposite to the inner protrusion 34*b*. An inclined surface 34*d* extending from the surface on the inner protrusion 34*b* side toward the outer edge is formed on the outer edge of the planar portion 34*a*. The shapes of the planar portion 34*a*, the inner protrusion 34*b*, and the inclined surface 34*d* influence the water sprinkle pattern because the water discharged from the nozzle 11 collides therewith and flows on the surfaces thereof when the sprinkler head is actuated.

The outer edge 3*a* of the valve cap 3 is positioned to overlap the inner edges 26*d* of the recesses 26. Thus, the water flows on the inclined surface 34*d* of the valve cap 3 and flows into the recesses 26 without reducing its momentum. In addition, the outer edge 3*a* of the valve cap 3 is positioned to overlap the closed ends 24*b* of the slits 24, so that the water flowing on the inclined surface 34*d* of the valve cap 3 is sprinkled downward from the slits 24 while maintaining its momentum.

In this embodiment, the pins 22 are disposed adjacent to the outer edge 3*a* of the valve cap 3. More specifically, because the deflector 21 slides along the pins 22 when the heat-sensitive actuator 4 is actuated, the pins 22 are disposed adjacent to the outer edge 3a of the valve cap 3 with slight clearances between the valve cap 3 and the pins 22. By disposing the pins 22 adjacent to the outer edge 3a of the valve cap 3 like this, the water discharged from the nozzle 11 directly flows from the valve cap 3 into the recesses 26, where the pins 22 are disposed. Thus, the water is sprinkled from the outer edges 26b of the recesses 26 while maintaining its momentum.

Figure 6:
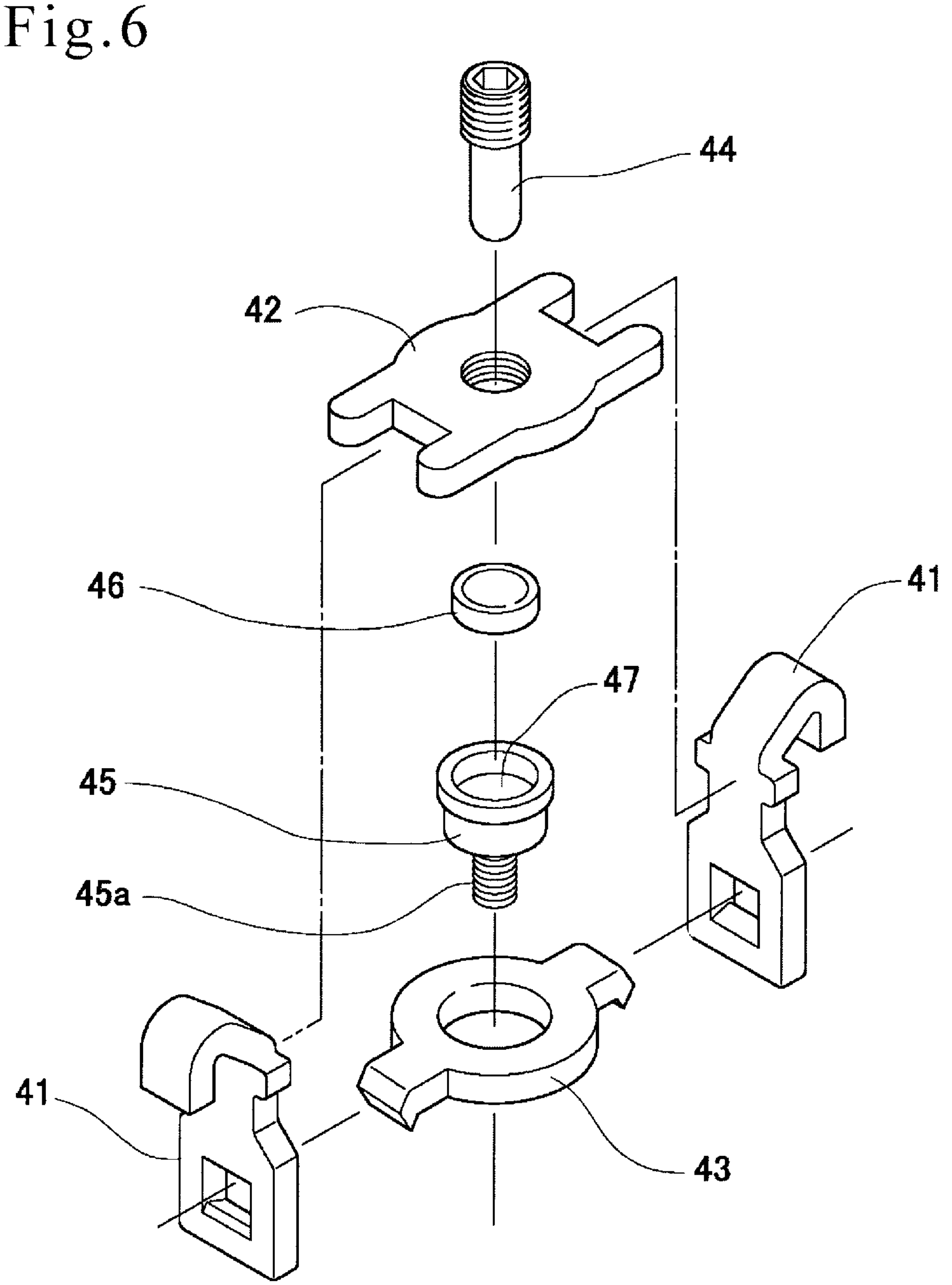
FIG. 6 is an exploded perspective view of a heat-sensitive actuator.
Figure 7:
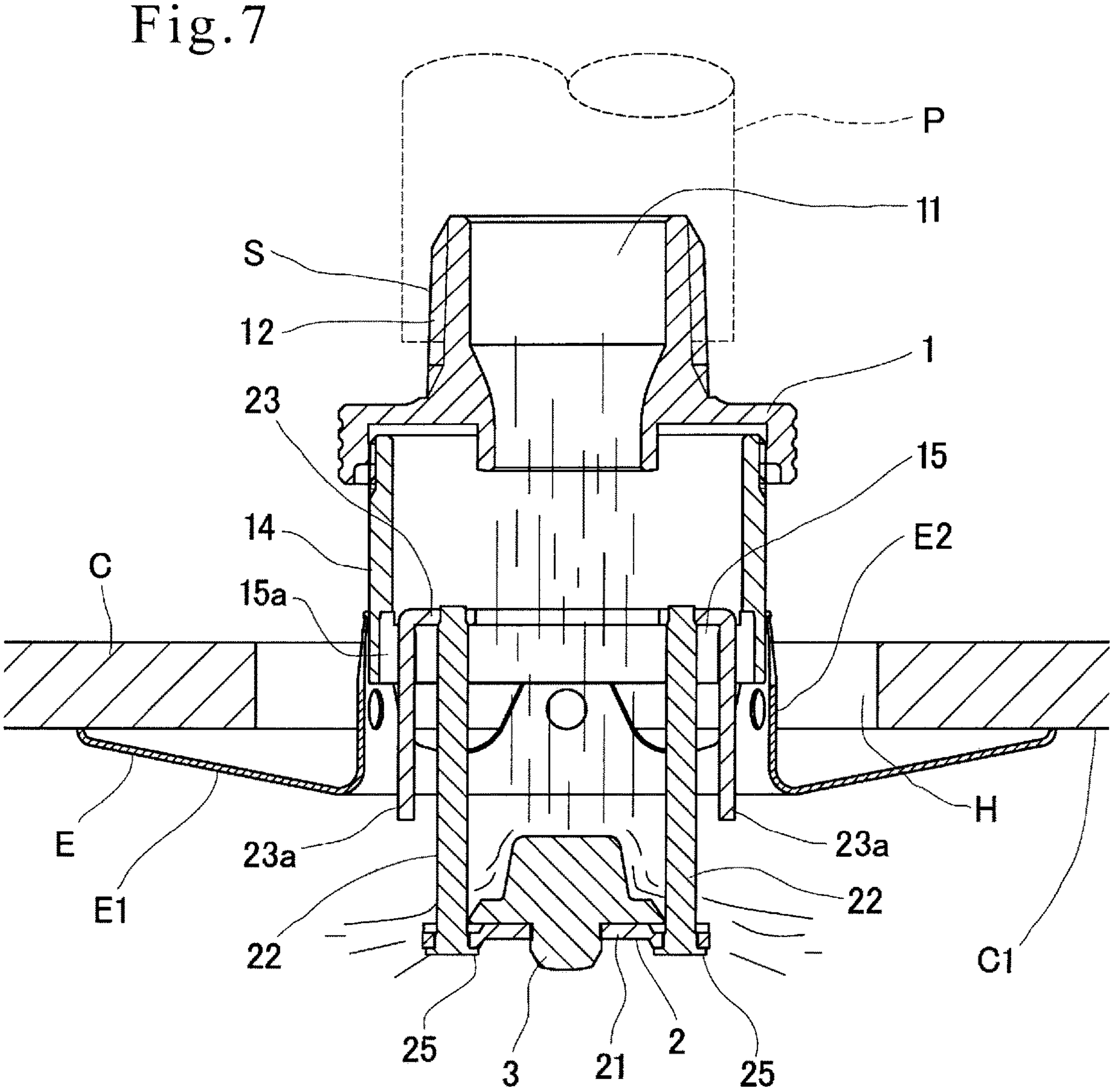
FIG. 7 illustrates a state during sprinkling in FIG. 2.

The heat-sensitive actuator 4 illustrated in FIGS. 1, 2, and 6 includes a pair of levers 41, a support plate 42, a balancer 43, a set screw 44, a cylinder 45, a plunger 46, and a fusible alloy 47. Known parts of the structure of the heat-sensitive actuator 4 are described in, for example, Japanese Unexamined Patent Application Publication No. 2005-27929.

The cylinder 45 is formed in a bottomed cylindrical shape, and a male screw protrudes from the bottom surface thereof. The inside of the cylinder 45 is filled with the fusible alloy 47, and the plunger 46 is placed on the fusible alloy 47, that is, on the side opposite to the bottom surface of the cylinder 45. These members constitute a heat-sensitive element of the heat-sensitive actuator 4. As illustrated in FIGS. 1 and 2, the heat collector 5 is connected to the male screw. Thus, the heat collector 5 is held by the body 1 so as to protrude from the lower end of the body 1.

The heat collector 5 has a bowl shape with a nut 51 attached to the center thereof. The nut 51 is screwed with the male screw 45a of the cylinder 45. The nut 51 is formed to have a large diameter at the end on the heat collector 5 side and a small diameter at the end on the cylinder 45 side. Thus, a step 54 is formed in the middle of the nut 51. After the nut 51 is connected to the cylinder 45, an adhesive is poured into the screw-connected portion between the nut 51 and the male screw 45a and cured.

The nut 51 is in direct contact with the bottom surface of the cylinder 45 at the heat-collector-5-side end. The heat-collector-5-side end of the nut 51 has a larger diameter than the cylinder-45-side end. Because this increases the contact area between the heat collector 5 and the nut 51, a stable bonding strength is obtained between the heat collector 5 and the nut 51. Furthermore, because the contact area between the heat collector 5 and the nut 51 is larger than the cylinder-side end, the heat absorbed by the heat collector 5 can be efficiently transmitted to the nut 51.

The outer diameter of the end of the nut 51 is set to be smaller than or equal to the diameter of the bottom surface of the cylinder 45. More preferably, the outer diameter of the end of the nut 51 is set to be smaller than or equal to the inner diameter of the cylinder 45. By setting so, the heat absorbed by the heat collector 5 is transmitted to the fusible alloy 47 through the nut 51 and the bottom surface of the cylinder 45 and not through, for example, the side surface of the cylinder 45. Thus, the loss during heat transmission is suppressed.

The heat collector 5 has a plurality of openings 55 in a side surface thereof. The openings 55 have equal lengths and are arranged at equal intervals over the entire circumference of the side surface of the heat collector 5. In the embodiment illustrated in FIG. 1, six openings 55 are provided. The number of the openings 55 is greater than the number of the levers 41. By making the openings 55 have a certain size, the efficiency of passage of airflow to the heat collector 5 can be improved. More specifically, the height of the openings 55 is 2 to 5 mm, and the width of the openings 55 is 8 to 12 mm. Because this configuration allows the airflow heated by fire to flow into the heat collector 5 through the openings 55, the heat collector 5 can absorb heat also from the inside.

An escutcheon E has a dish part E1 for covering a hole H between a ceiling C and the sprinkler head S, and a tube part E2 extending from the inner edge of the dish part E1 and engaged with the frame 14. The dish part E1 is configured such that an outer circumferential edge thereof extending outward from the lower end of the tube part E2 can be in contact with the ceiling C1.

Next, the process of how the sprinkler head S according to the embodiment of the present disclosure is actuated in the event of fire will be described.

As illustrated in FIG. 1, the sprinkler head S is installed in a state in which the body 1 is connected to the water supply pipe P by screws and the heat collector 5 is exposed indoors from the ceiling C. The ceiling C is provided with the hole H through which the sprinkler head S can be inserted to the indoor side, and the escutcheon E is provided to cover the hole H.

When a fire occurs, the indoor air is heated by the heat of the fire, an ascending air current is generated, and the heated air accumulates under the ceiling C. The air driven by the ascending air current flows along the dish part E1 of the escutcheon E and flows into a clearance E3 between the tube part E2 and the heat collector 5. Then, the airflow passes through the openings 55 and reaches the inside of the heat collector 5. The heat of the airflow is absorbed from the surfaces of the heat collector 5, the nut 51, and the cylinder 45 and is transmitted to the fusible alloy 47, promoting melting of the fusible alloy 47.

Once the fusible alloy 47 melts, the plunger 46 moves toward the bottom surface of the cylinder 45, loosening the engagement between the balancer 43 and the levers 41. Then, the lower ends of the levers 41 rotate and are disengaged from the balancer 43. The levers 41 further rotate and are dropped off the step 15 of the frame 14. The saddle 31 and the valve cap 3 placed on the levers 41 also drop to the outside of the frame 14.

The deflector unit 2 incorporated with the valve cap 3 slides through the frame 14 toward the step 15 under the action of the spring 33, so that the outer-edge side of the guide ring 23 is engaged with the step 15. The deflector 21 and the valve cap 3 move downward in the drawing along the pins 22 and are engaged with the flanges 25.

As a result, the deflector 21 and the valve cap 3 are suspended below the frame 14 by the pins 22. When the valve cap 3 is separated from the outlet end of the nozzle 11, the water in the water supply pipe P is discharged from the nozzle 11 and collides with the valve cap 3 and the deflector 21.

The water colliding with the valve cap 3 flows on the surface thereof, passes through the surface of the deflector 21, and is sprinkled over the floor. The water flowing around the pins 22 flows from the inclined surface 34d near the outer edge 3a of the valve cap 3 into the recesses 26 without passing through the deflector 21. The water flowing into the recesses 26 increases in flow rate and is straightened by the side walls 26a when passing through the narrow portions 26e between the pins 22 and the side walls 26a of the recesses 26, and is sprinkled from the outer edges 26b of the recesses 26. At this time, the water is sprinkled in the directions orthogonal to the linear outer edges 26b of the recesses 26, and the water is scattered at a position closer to the sprinkler head S than the water scattered from the outer edge 21b of the deflector 21. Furthermore, the water passing through the first slits 27 adjacent to the recesses 26 flows toward the extension of the virtual line Lx with increased flow rate, increasing the amount of water sprinkled behind the pins 22.

As described above, in this embodiment, the deflector 21 is provided with the recesses 26 extending from the portions around the pins 22 toward the outer edge 21*b* and is provided with the first slits 27 on both sides of the recesses 26 in the width direction. The thus-configured deflector 21 can increase the amount of water sprinkled in the directions in which the pins 22 are disposed. In particular, the smaller the distance between the first slits 27, the smaller the angle between the water sprinkled to the left side and the water sprinkled to the right side of the pins 22. Thus, the amount of water sprinkled in the directions of the pins 22 increases. For this reason, in this embodiment, the width of the recesses 26 is reduced as much as possible, so that the first slits 27 are close to each other.

Meanwhile, the water flowing from the valve cap 3 to the slits 24 is sprinkled over the floor in the area close to the position where the sprinkler head S is installed. As described above, because the slits 24 increase in width, i.e., tapered, toward the open ends 24*a*, the water flowing to the slits 24 is sprinkled while expanding along the taper. This increases the amount of water sprinkled in the area close to the sprinkler head S and achieves a water sprinkle pattern in which unevenness in the amount of sprinkled water is further suppressed. The water sprinkled from the outer edge 21*b* of the deflector 21 is sprinkled over the floor in an area far from the position where the sprinkler head S is installed.

Accordingly, the water colliding with the deflector 21 is sprinkled in all directions evenly over the floor to suppress and extinguish fire.

Advantages of the present disclosure that have not been described above will be described below.

The closed ends 24*b* of the slits 24 are positioned to overlap the outer edge 3*a* of the valve cap 3, and the water flowing on the surface of the valve cap 3 directly flows into the slits 24 from the inclined surface 34*d*. Furthermore, as the height of the inner protrusion 34*b* of the valve cap 3 increases, the water sprinkled from the slits 24 is sprinkled near the sprinkler head S. The height from the planar portion 34*a* to the top of the inner protrusion 34*b* is preferably 2 to 3 times the height from the back surface of the planar portion 34*a* facing the deflector 21 to the planar portion 34*a*, and is set to 2.5 to 2.8 times in this embodiment.

Furthermore, because the outer edges 26*b* of the recesses 26 are positioned on the inner side of the virtual outer circumferential circle of the deflector 21, the water sprinkled from the outer edges 26*b* of the recesses 26 is sprinkled near the sprinkler head S. By setting the positions of the outer edges 26*b* closer to the outer circumferential diameter of the deflector 21, water can be sprinkled to a farther position.

By combining the above-described configurations, the amount of water sprinkled near the sprinkler head S can be increased.

Figure 4:
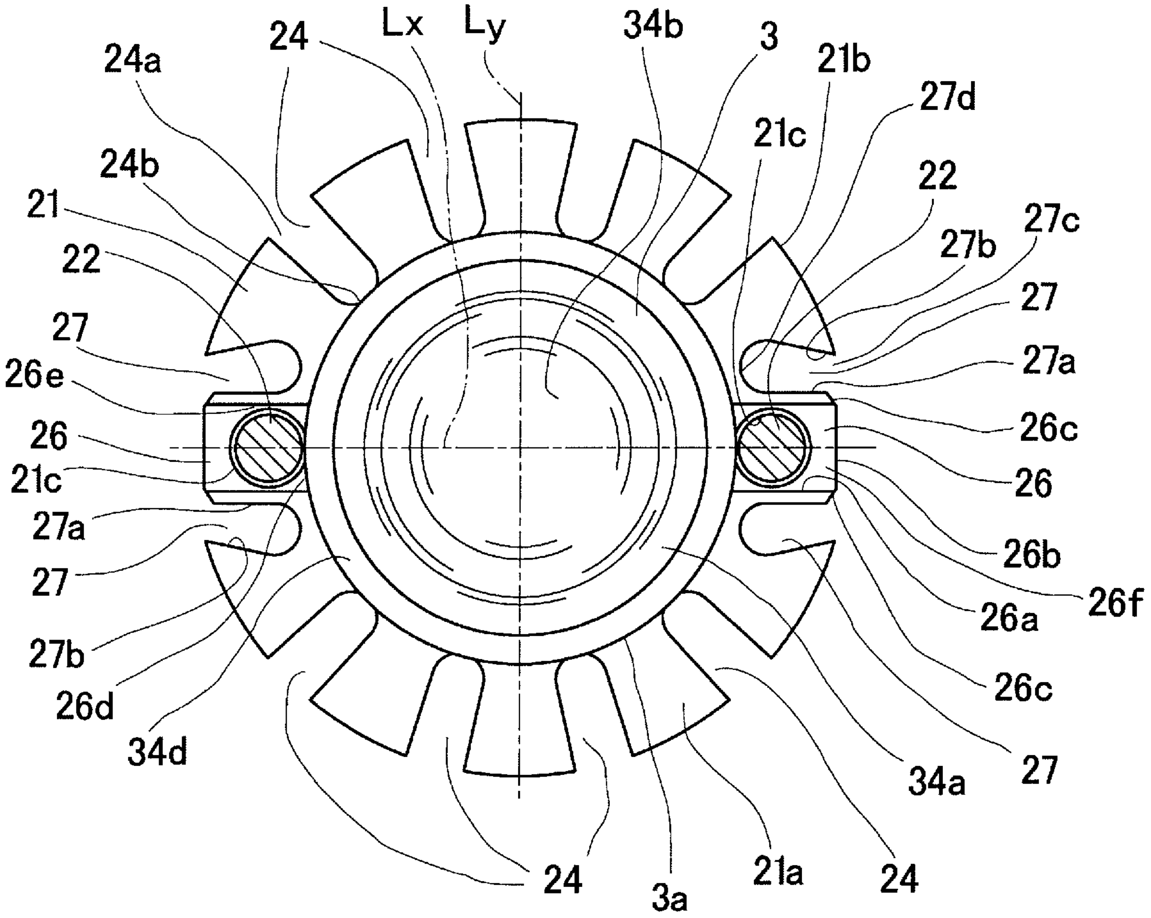
FIG. 4 is a plan view of a deflector.

The shape of the deflector of the sprinkler head is not limited to the aspect illustrated in FIGS. 3 to 5 described above. That is, it is only necessary that recesses extend from portions around the pins on the nozzle-side surface of the deflector toward the outer edge of the deflector and are recessed into the nozzle-side surface of the deflector, that the first slits are provided on both sides of the recesses in the width direction, and that the open ends of the first slits are provided adjacent to the outer edges of the recesses.

Figure 8:
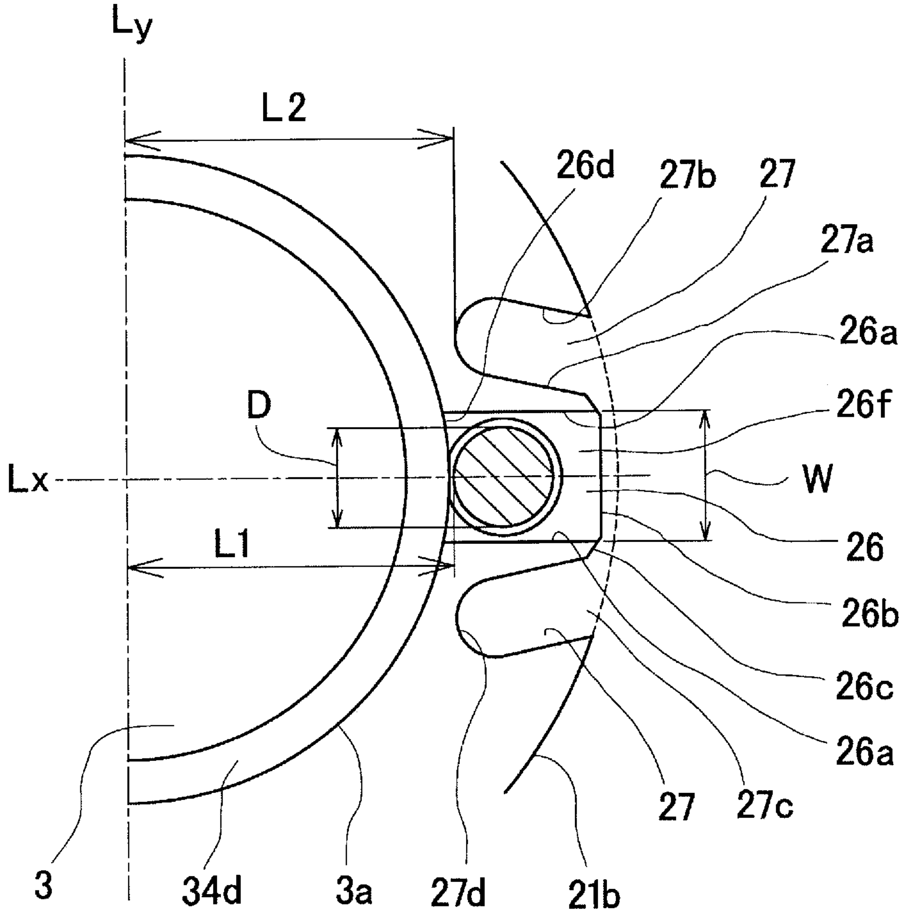
FIG. 8 is an enlarged plan view of a pin (support) and the vicinity thereof according to a modification of the deflector.

For example, as illustrated in FIG. 8, a configuration is possible in which the first sides 27*a* of the first slits 27 are parallel to the second sides 27*b*, the first sides 27*a* are inclined with respect to the virtual line Lx, and the first sides 27*a* intersect with the virtual line Lx when extended in the direction of the open ends 27*c*. Also with this configuration in which the first sides 27*a* are inclined with respect to the virtual line Lx, as long as the first slits 27 are disposed such that the positions of the open ends 27*c* are provided adjacent to the recesses 26 in the width direction, it is possible to increase the amount of water sprinkled in the directions in which the pins 22 are disposed.

Figure 9:
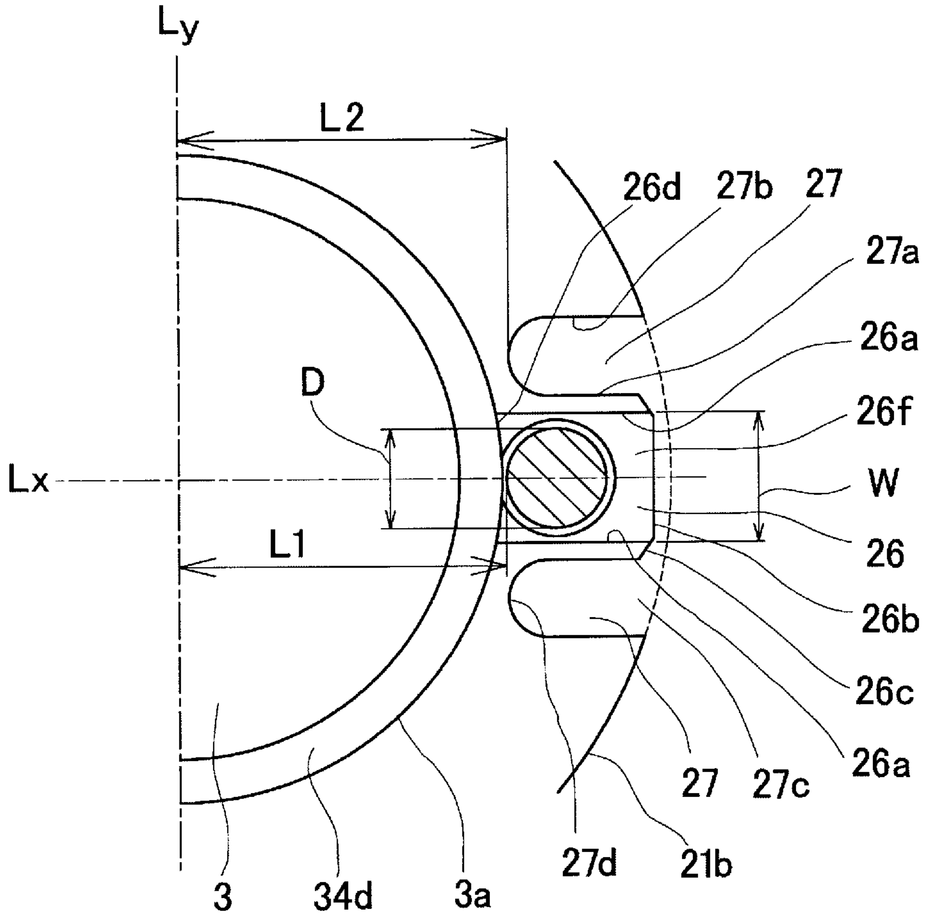
FIG. 9 is an enlarged plan view of a pin (support) and the vicinity thereof according to another modification of the deflector.

Furthermore, as illustrated in FIG. 9, the second sides 27*b* of the first slits 27 may be arranged parallel to the first sides 27*a* so as to extend in a direction parallel to the virtual line Lx. Also with this configuration in which the second sides 27*b* are arranged parallel to the virtual line Lx, as long as the first slits 27 are disposed such that the positions of the open ends 27*c* of the first slits 27 are provided adjacent to the recesses 26 in the width direction, it is possible to increase the amount of water sprinkled in the directions in which the pins 22 are disposed.

Figure 10:
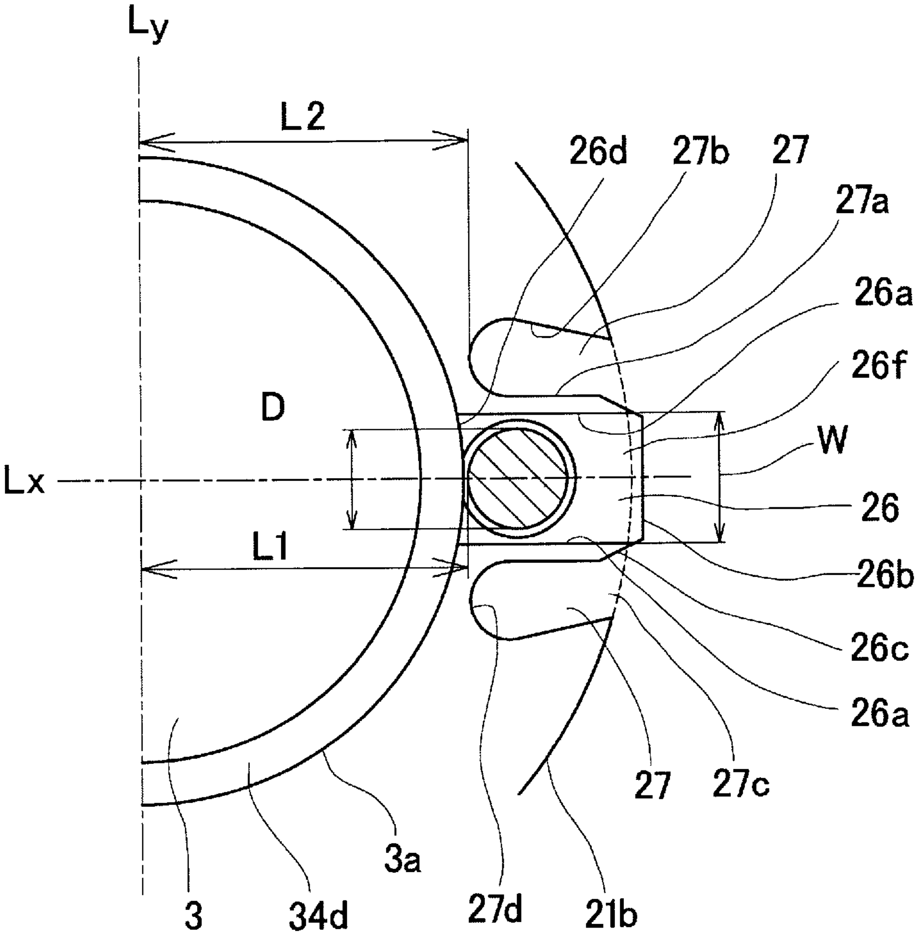
FIG. 10 is an enlarged plan view of a pin (support) and the vicinity thereof according to still another modification of the deflector.

Furthermore, as illustrated in FIG. 10, the outer edges 26*b* of the recesses 26 may be positioned slightly on the outer side of the virtual outer circumferential circle of the deflector 21. Also with this configuration in which the outer edges 26*b* of the recesses 26 are positioned slightly on the outer side of the virtual outer circumferential circle of the deflector 21, as long as the positions of the open ends 27*c* of the first slits 27 are provided adjacent to the recesses 26 in the width direction, it is possible to increase the amount of water sprinkled in the directions in which the pins 22 are disposed.

Although the embodiments of the present disclosure have been described in detail above, it will be easily understood by those skilled in the art that many modifications can be made without substantially departing from the new matter and effects of the present disclosure. Therefore, all such modifications are included in the scope of the present disclosure.

For example, a term described at least once in specification or drawings with a different term having a broader meaning or the same meaning can be replaced with that different term in anywhere in specification or drawings. In addition, the configurations and operations of the sprinkler head and the deflector are not limited to those described in the embodiments of the present disclosure, and various modifications are possible.

REFERENCE SIGNS LIST

1 Body, 2 Deflector unit, 3 Valve cap, 3*a* Outer edge (of the valve cap), 4 Heat-sensitive actuator, 5 Heat collector, 11 Nozzle, 14 Frame, 15 Step, 21 Deflector, 21*a* Planar surface (nozzle-side surface), 21*b* Outer edge (of the deflector), 21C Hole (pin insertion hole), 22 Pin (support), 23 Guide ring, 24 Slit, 24*a* Open end (of the slit), 24*b* Closed end (of the slit), 25 Flange, 26 Recess, 26*a* Side wall, 26*b* Outer edge (of the recess), 26*c* Inclined surface, 26*d* Inner edge (of the recess), 26*e* Narrow portion, 26*f* Bottom surface, 27 First slit, 27*a* First side, 27*b* Second side, 27*c* Open end (of the first slit), 27*d* closed end (of the first slit), 31 Saddle, 32 Seal member, 33 Spring, 34*a* Planar portion (of the valve cap), 34*b* Inner protrusion (of the valve cap), 34*c* Outer protrusion (of the valve cap), 34*d* Inclined surface (of the valve cap), 41 Lever, 42 Support plate, 43 Balancer, 44 Set screw, 45 Cylinder, 45*a* Male screw, 46 Plunger, 47 Fusible alloy, 51 Nut, 54 Step, 55 Opening, S Sprinkler head

The invention claimed is:

1. A sprinkler head comprising:

a body having a nozzle that discharges a fire-extinguishing liquid;

a valve cap that closes the nozzle;

a heat-sensitive actuator that holds the valve cap in a state of closing the nozzle and that releases the closed state when decomposed and actuated;

a disk-like deflector that sprinkles the fire-extinguishing liquid discharged from the nozzle outward in a direction intersecting an axis of the nozzle; and a support that supports the deflector, wherein a nozzle-side surface of the deflector has a recess extending from a portion around the support toward an outer edge of the deflector and recessed into the nozzle-side surface of the deflector, and first slits are provided on both sides of the recess in the width direction such that open ends thereof are adjacent to an outer edge of the recess, an entire outer circumferential edge of the recess is positioned on an inner side of a virtual outer circumferential circle of the deflector, the virtual outer circumferential circle being defined by a maximum radial extent of the deflector, and an outer edge of the valve cap is positioned to overlap an inner edge of the recess.

2. The sprinkler head according to claim 1, wherein each of the first slits decreases in width from a side adjacent to the center of the deflector toward the outer edge of the deflector.

3. The sprinkler head according to claim 1, wherein each of the first slits has a first side located adjacent to the support and a second side facing the first side, the first side is formed along a side wall of the recess adjacent thereto, and the second side is formed so as to approach the first side from a closed-end side toward an open-end side of the first slit.

4. The sprinkler head according to claim 1, wherein the outer edge of the recess is formed linearly.

5. The sprinkler head according to claim 1, wherein a width of the recess is set to 1.2 to 1.5 times a diameter of the support.

6. The sprinkler head according to claim 1, wherein a corner between the outer edge of the recess and the first slit is cut at an angle.

7. The sprinkler head according to claim 1, wherein the deflector has a plurality of linear slits formed in the outer edge of the deflector, the width of the slits has a tapered shape that widens toward open ends on an outer circumferential side of the deflector, and closed ends of the slits, which are ends adjacent to the center of the deflector, are positioned to overlap the outer edge of the valve cap.

8. The sprinkler head according to claim 1, wherein a plurality of the supports are provided between the deflector and a guide ring, and the guide ring is slidable in a tubular frame provided on an outer circumferential side of an outlet end of the nozzle and is engaged with a step provided at a lower end inside the frame.

9. The sprinkler head according to claim 1, wherein the support is located in the recess, and the outer edge of the valve cap is aligned with the inner edge of the recess.

10. The sprinkler head according to claim 1, wherein the support is located in the recess and is aligned with the inner edge of the recess.

11. The sprinkler head according to claim 1, wherein the outer edge of the valve cap is disposed in immediate proximity to the outer circumference surface of the support on a center side of the deflector.

12. The sprinkler head according to claim 8, wherein arms are provided on an outer edge of the guide ring so as to be parallel to the supports.

13. The sprinkler head according to claim 12, wherein the arms are disposed on a plane where a virtual line and the axis of the nozzle intersect with each other.

14. The sprinkler head according to claim 12, wherein the arms are disposed in grooves formed in the step and parallel to the axis of the nozzle.

15. A sprinkler head comprising:

a body having a nozzle that discharges a fire-extinguishing liquid;

a valve cap that closes the nozzle;

a heat-sensitive actuator that holds the valve cap in a state of closing the nozzle and that releases the closed state when decomposed and actuated;

a disk-like deflector that sprinkles the fire-extinguishing liquid discharged from the nozzle outward in a direction intersecting an axis of the nozzle; and a support that supports the deflector, wherein a nozzle-side surface of the deflector has a recess extending from a portion around the support toward an outer edge of the deflector and recessed into the nozzle-side surface of the deflector, and first slits are provided on both sides of the recess in the width direction such that open ends thereof are adjacent to an outer edge of the recess, an entire outer circumferential edge of the recess is positioned on an inner side of a virtual outer circumferential circle of the deflector, the virtual outer circumferential circle being defined by a maximum radial extent of the deflector, and wherein the disk-like deflector has a circular shape.

16. A sprinkler head comprising:

a body having a nozzle that discharges a fire-extinguishing liquid;

a valve cap that closes the nozzle;

a heat-sensitive actuator that holds the valve cap in a state of closing the nozzle and that releases the closed state when decomposed and actuated;

a disk-like deflector that has a plurality of plate pieces arranged in a circumferential direction and a plurality of second slits provided between the plate pieces, and sprinkles the fire-extinguishing liquid discharged from the nozzle outward in a direction intersecting an axis of the nozzle; and a support that supports the deflector, wherein outer circumferential edges of the plurality of plate pieces define a virtual outer circumferential circle of the deflector, a nozzle-side surface of the deflector has a recess extending from a portion around the support radially outward toward the virtual outer circumferential circle of the deflector and recessed into the nozzle-side surface of the deflector, the deflector further has first slits, each located on a respective one of both sides of the recess in the width direction and having an open end adjacent to an outer circumferential edge of the recess, an entire outer circumferential edge of the recess is positioned on an inner side of the virtual outer circumferential circle of the deflector, and an outer edge of the valve cap is positioned to overlap an inner edge of the recess.

17. The sprinkler head according to claim 16, wherein each of the first slits decreases in width from a side adjacent to the center of the deflector toward the virtual outer circumferential circle of the deflector.

18. The sprinkler head according to claim 16, wherein each of the first slits has a first side located adjacent to the support and a second side facing the first side, the first side is formed along a side wall of the recess adjacent thereto, and the second side is formed so as to approach the first side from a closed-end side toward an open-end side of the first slit.

19. The sprinkler head according to claim 16, wherein a width of the recess is set to 1.2 to 1.5 times a diameter of the support.

20. The sprinkler head according to claim 16, wherein a corner between the outer edge of the recess and the first slit is cut at an angle.

* * * * *